(12) United States Patent
Saito et al.

(10) Patent No.: US 8,255,007 B2
(45) Date of Patent: *Aug. 28, 2012

(54) IN-VEHICLE HANDSFREE APPARATUS

(75) Inventors: Soichi Saito, Obu (JP); Hiroyasu Hamanishi, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/402,962

(22) Filed: Feb. 23, 2012

(65) Prior Publication Data

US 2012/0149441 A1    Jun. 14, 2012

Related U.S. Application Data

(63) Continuation of application No. 12/384,305, filed on Apr. 2, 2009, now Pat. No. 8,150,474.

(30) Foreign Application Priority Data

Apr. 4, 2008  (JP) .................................. 2008-098240
Apr. 4, 2008  (JP) .................................. 2008-098242

(51) Int. Cl.
*H04M 1/00* (2006.01)
(52) U.S. Cl. ..... 455/569.2; 455/39; 455/41.2; 455/41.3; 455/66.1; 455/569.1; 455/575.9
(58) Field of Classification Search ............. 455/39, 455/41.2, 41.3, 66.1, 550.1, 569.1, 569.2, 455/575.9
See application file for complete search history.

(56) References Cited

U.S. PATENT DOCUMENTS

| | | | |
|---|---|---|---|
| 6,397,086 B1 | 5/2002 | Chen | |
| 6,687,517 B2 | 2/2004 | Kinnunen | |
| 7,050,834 B2 | 5/2006 | Harwood et al. | |
| 7,162,276 B2 | 1/2007 | Iwase | |
| 7,552,009 B2 | 6/2009 | Nelson | |
| 2002/0032048 A1 | 3/2002 | Kitao et al. | |
| 2006/0040714 A1 | 2/2006 | Suzuki | |
| 2006/0224305 A1* | 10/2006 | Ansari et al. | 701/202 |
| 2007/0178944 A1 | 8/2007 | Mitsuru et al. | |
| 2008/0085745 A1 | 4/2008 | Ozaki | |
| 2009/0253467 A1 | 10/2009 | Saito | |

FOREIGN PATENT DOCUMENTS

JP    2001-243231    9/2001

(Continued)

OTHER PUBLICATIONS

Office Action dated Aug. 24, 2010 in corresponding Japanese Application No. 2008-098242.

(Continued)

*Primary Examiner* — Olumide T Ajibade Akonai
(74) *Attorney, Agent, or Firm* — Harness, Dickey & Pierce, PLC

(57) ABSTRACT

An in-vehicle handsfree apparatus connects a handsfree profile (HFP) with a cellular phone, and then connects a service discovery profile (SDF) with the cellular phone to thereby designate a compliance state of the cellular phone with respect to a phone book access profile (PBAP) as a PBAP compliance flag. Then, when a user performs an operation to require an all item transfer to transfer all items of phone book data registered in the cellular phone, the handsfree apparatus refers to the PBAP compliance flag to thereby select and connect either the PBAP or an object push profile (OPP) with the cellular phone.

8 Claims, 8 Drawing Sheets

FOREIGN PATENT DOCUMENTS

| | | |
|---|---|---|
| JP | 2002-135400 | 5/2002 |
| JP | 2002-193046 | 7/2002 |
| JP | 2002-368873 | 12/2002 |
| JP | 2005-210181 | 8/2005 |
| JP | 2005-234910 | 9/2005 |
| JP | 2005-277593 | 10/2005 |
| JP | 2006-094477 | 4/2006 |
| JP | 2006-186642 | 7/2006 |
| JP | 2007-074409 | 3/2007 |
| JP | 2007-172289 | 7/2007 |
| JP | 2007-281652 | 10/2007 |
| JP | 2008-098767 | 4/2008 |
| JP | 2008-098981 | 4/2008 |
| WO | 2006/074345 | 7/2006 |

OTHER PUBLICATIONS

Office Action dated May 25, 2010 in Japanese Application No. 2008-98242 with English translation thereof.

Office Action dated Mar. 13, 2012 in corresponding Japanese Application No. 2008-098240 with English translation.

* cited by examiner

IN-VEHICLE HANDSFREE APPARATUS

CROSS REFERENCE TO RELATED APPLICATION

This application is a continuation of U.S. patent application Ser. No. 12/384,305 filed on Apr. 2, 2009. This application is based on and incorporates herein by reference Japanese Patent Applications No. 2008-98240 filed on Apr. 4, 2008 and No. 2008-98242 filed on Apr. 4, 2008. The entire disclosures of each of the above applications are incorporated herein by reference.

FIELD OF THE INVENTION

The present invention relates to an in-vehicle handsfree apparatus to connect a phone book data transfer protocol for transmitting phone book data registered in a cellular phone.

BACKGROUND OF THE INVENTION

Patent Document 1: JP 2002-193046 A (corresponding to US2002/0032048)

Patent document 1 describes a technology for an in-vehicle handsfree apparatus to connect a Bluetooth (trade marks, referred to as "BT") communication link to thereby transmit phone book data registered in a cellular phone.

The BT communication standard includes profiles for a phone book data transfer such as a phone book access profile (PBAP) and an object push profile (OPP). The PBAP is a profile belonging to a so-called pull type of phone book data transfer. In the state where the PBAP is connected, a user only needs an operation to an in-vehicle handsfree apparatus, without need of an operation to the cellular phone, for making the cellular phone transmit all the registered phone book data to the handsfree apparatus. In contrast, the OPP is a profile belonging to a so-called push type of phone book data transfer. In the state where the OPP is connected, a user needs operations to both an in-vehicle handsfree apparatus and a cellular phone for making the cellular phone transmit the registered phone book data to the handsfree apparatus. Further, the user needs to designate a part of phone book data, which should be transmitted from the registered phone book data.

Thus, in view of the user's operability, it looks desirable that the PBAP is first connected between the in-vehicle handsfree apparatus and cellular phone to thereby make the phone book data be transferred from the cellular phone to the handsfree apparatus. Herein, whether the cellular phone is compliant with or has a function of the PBAP can be determined only after the connection procedure is started between the handsfree apparatus and cellular phone. Therefore, in cases that the relevant cellular phone is compliant with the PBAP, the phone book data can be transferred without difficulty as follows. A user performs an operation to instruct the cellular phone to transmit the phone book data. The in-vehicle handsfree apparatus starts a procedure for the PBAP connection to the cellular phone. The in-vehicle handsfree apparatus establishes the connection of the PBAP with the cellular phone. The phone book data registered in the cellular phone is thereby transmitted to the in-vehicle handsfree apparatus.

In contrast, in cases that the relevant cellular phone is not compliant with the PBAP, the phone book data need to be transferred as follows. The in-vehicle handsfree apparatus starts a procedure for the PBAP connection to the cellular phone. The in-vehicle handsfree apparatus fails to establish the connection of the PBAP with the cellular phone. Then, the cellular phone starts a procedure for the OPP connection to the in-vehicle handsfree apparatus. The cellular phone establishes the connection of the OPP with the in-vehicle handsfree apparatus. The user performs an operation to designate a part of phone book data from all the phone book data registered in the cellular phone. The designated phone book data is thereby transmitted to the in-vehicle handsfree apparatus from the cellular phone. That is, the user eventually knows whether the relevant cellular phone is compliant with the PBAP after executing an operation to instruct the cellular phone to transmit the phone book data. In other words, the user needs to know it before the phone book data can be transmitted to the in-vehicle handsfree apparatus from the cellular phone by either the PBAP or OPP. Such procedure reduces the usability.

SUMMARY OF THE INVENTION

The present invention is made in view of the above situation. It is an object of the present invention to provide an in-vehicle handsfree apparatus to allow phone book data transfer from a cellular phone, without need of requiring a user to previously know the phone book data transfer protocol, with which the cellular phone is compliant by performing an operation to require the phone book data transfer. Thereby usability is enhanced.

As a first example of the present invention, an in-vehicle handsfree apparatus is provided as follows. A first phone book data transfer protocol connecting section is configured to connect a first phone book data transfer protocol with a cellular phone compliant with the first phone book data transfer protocol for executing a phone book data transfer from the cellular phone to the in-vehicle handsfree apparatus without need of a user's operation to the cellular phone. A second phone book data transfer protocol connecting section is configured to connect a second phone book data transfer protocol with a cellular phone compliant with the second phone book data transfer protocol for executing a phone book data transfer from the cellular phone to the in-vehicle handsfree apparatus with need of a user's operation to the cellular phone. A handsfree protocol connecting section is configured to connect a handsfree communication protocol with a cellular phone compliant with the handsfree communication protocol for executing a handsfree communication using the cellular phone. A function query protocol connecting section is configured to connect a function query protocol with a cellular phone compliant with the function query protocol for asking a compliance state relative to a phone book data transfer protocol of the cellular phone. A control section is configured, when connecting the handsfree communication protocol with a cellular phone using the handsfree protocol connecting section, to connect the function query protocol with the cellular phone using the function query protocol connecting section and store in a storage section a function query response, which is notified by the cellular phone, in association with the cellular phone. Further, the control section is configured, when the user performs, using an operation section, an operation to require all item transfer, which regards all items of phone book data as a transfer target, to refer to a function query response associated with a cellular phone, which the all item transfer is required of, in the storage section and select one of the first phone book data transfer protocol and the second phone book data transfer protocol, to thereby connect the one of the first phone book data transfer protocol and the second phone book data transfer protocol using a corresponding one of the first phone book data transfer protocol connecting section and the second phone book data transfer protocol connecting section.

As a second example of the present invention, an in-vehicle handsfree apparatus is provided as follows. A first phone book data transfer protocol connecting section configured to connect a first phone book data transfer protocol with a cellular phone compliant with the first phone book data transfer protocol for executing a phone book data transfer from the cellular phone to the in-vehicle handsfree apparatus without need of a user's operation to the cellular phone. A second phone book data transfer protocol connecting section is configured to connect a second phone book data transfer protocol with a cellular phone compliant with the second phone book data transfer protocol for executing a phone book data transfer from the cellular phone to the in-vehicle handsfree apparatus with need of a user's operation to the cellular phone. A handsfree protocol connecting section is configured to connect a handsfree communication protocol with a cellular phone compliant with the handsfree communication protocol for executing a handsfree communication using the cellular phone. A function query protocol connecting section is configured to connect a function query protocol with a cellular phone compliant with the function query protocol for asking a compliance state relative to a phone book data transfer protocol of the cellular phone. A control section is configured, when connecting the handsfree communication protocol with a cellular phone using the handsfree protocol connecting section, to connect a function query protocol with the cellular phone using the function query protocol connecting section and store a function query response, which is notified by the cellular phone, in association with the cellular phone in a storage section. Further, the control section is configured, when the user performs an operation to require a phone book data transfer using an operation section, to refer to a function query response, which is stored in the storage section in association with a cellular phone, which the phone book data transfer is required of, and select one of the first phone book data transfer protocol and the second phone book data transfer protocol to thereby connect the one of the first phone book data transfer protocol and the second phone book data transfer protocol using a corresponding one of the first phone book data transfer protocol connecting section and the second phone book data transfer protocol connecting section.

As another example of the present invention, a method is provided for performing a phone book data transfer in an in-vehicle handsfree apparatus capable of connecting a handsfree communication protocol with a cellular phone having phone book data. The cellular phone complies with both a first phone book data transfer protocol and a second phone book transfer protocol or complies with only the second phone book data transfer protocol. The first phone book data transfer is used for executing an all item transfer to transfer all the phone book data of the cellular phone without need of a user's operation to the cellular phone. The second phone book transfer protocol is used for executing an addition transfer to transfer part of the phone book data of the cellular phone with need of a user's operation to the cellular phone. The method comprises: connecting a handsfree communication protocol with the cellular phone for executing a handsfree communication; connecting a function query protocol with the cellular phone for asking a compliance state relative to a phone book data transfer protocol of the cellular phone while the handsfree communication protocol is connected with the cellular phone; storing in a storage section a function query response, which is notified by the cellular phone, in association with the cellular phone; referring to the function query response associated with the cellular phone in the storage section when the user performs an operation to require the all item transfer; selecting one of the first phone book data transfer protocol and the second phone book data transfer protocol based on the function query response referred to; and connecting the selected one of the first phone book data transfer protocol and the second phone book data transfer protocol.

As yet another example of the present invention, a method is provided for performing a phone book data transfer in an in-vehicle handsfree apparatus capable of connecting a handsfree communication protocol with a cellular phone having phone book data. The cellular phone complies with both a first phone book data transfer protocol and a second phone book transfer protocol or complies with only the second phone book data transfer protocol. The first phone book data transfer is for executing a data transfer of the phone book data of the cellular phone without need of a user's operation to the cellular phone. The second phone book transfer protocol is for executing a data transfer of the phone book data of the cellular phone with need of a user's operation to the cellular phone. The method comprises: connecting a handsfree communication protocol with the cellular phone for executing a handsfree communication; connecting a function query protocol with the cellular phone for asking a compliance state relative to a phone book data transfer protocol of the cellular phone while the handsfree communication protocol is connected with the cellular phone; storing in a storage section a function query response, which is notified by the cellular phone, in association with the cellular phone; referring to the function query response associated with the cellular phone in the storage section when the user performs an operation to require a phone book data transfer; selecting one of the first phone book data transfer protocol and the second phone book data transfer protocol based on the function query response referred to; and connecting the selected one of the first phone book data transfer protocol and the second phone book data transfer protocol.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
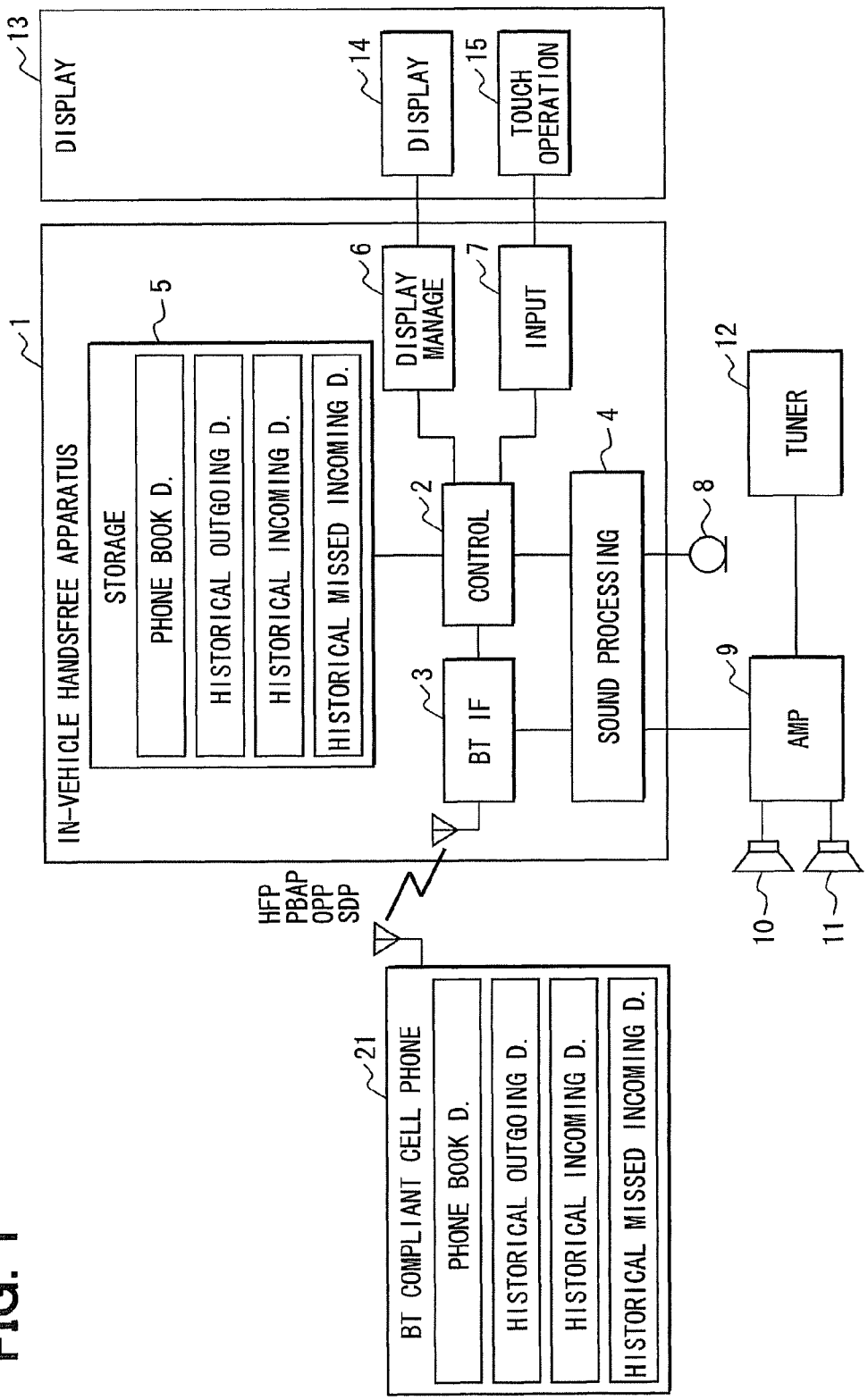
FIG. 1 is a functional block diagram of a schematic configuration of an in-vehicle handsfree apparatus according to an embodiment of the present invention.

An embodiment according to the present invention will be explained with reference to drawings. An in-vehicle handsfree apparatus 1 is mounted in a subject vehicle. The in-vehicle handsfree apparatus includes a control section 2, a Bluetooth (registered trademark, referred to as BT) interface section 3, a call sound processing section 4, a storage section 5, a display management section 6, and an input section 7. The BT interface section 3 may function as an example of a first phone book data transfer protocol connecting means or section, a second phone book data transfer protocol connecting means or section, a handsfree protocol connecting means or section, or a function query protocol connecting means or section.

The control section 2 includes a CPU, RAM, ROM, I/O bus, etc., and controls an overall operation of the in-vehicle handsfree apparatus 1 such as a communication operation, a phone book data management operation, etc. The BT interface section 3 responds to several profiles specified in the BT communication standard. Such profiles include a handsfree profile (HFP) for performing a handsfree communication, a phone book access profile (PBAP) for transmitting phone book data, an object push profile (OPP) also for transmitting phone book data, and a service discovery profile (SDP) for querying a relevant cellular phone about functions, which are selectively provided in the cellular phone among profiles specified in the BT communication standard.

The above-mentioned HFP is equivalent to a handsfree communication protocol. The PBAP is a profile to allow the relevant cellular phone 21 to transmit or transfer phone book data to the in-vehicle handsfree apparatus 1 by a user performing an operation to only the in-vehicle handsfree apparatus 1, without need of performing an operation to the cellular phone 21. The PBAP is equivalent to a first phone book data transfer protocol. The OPP is a profile to allow the relevant cellular phone 21 to transmit or transfer phone book data to the in-vehicle handsfree apparatus 1 only when a user performs operations to both the in-vehicle handsfree apparatus 1 and the cellular phone 21. The OPP is equivalent to a second phone book data transfer protocol. The SDP is equivalent to a function query protocol. Herein, the above profiles signify communication protocols defined for every function.

The call sound processing section 4 is connected with a microphone 8 and an audio amplifier 9. The microphone 8 is arranged at a position to easily collect user's utterance, for instance, at a vicinity of a steering wheel in the passenger compartment. The audio amplifier 9 is arranged outside of the in-vehicle handsfree apparatus 1. When performing a handsfree communication with the cellular phone 21 brought into the passenger compartment of the vehicle, the call sound processing section 4 processes as follows. When a sound uttered by a user is inputted as a transmit voice via the microphone 8, the inputted transmit voice is sound processed and outputted to the BT interface section 3. When receiving a reception sound via the BT interface section 3, the call sound processing section 4 outputs the received reception sound to the audio amplifier 9. When the audio amplifier 9 receives the reception sound from the call sound processing section 4, the audio amplifier 9 amplifies the reception sound and outputs the amplified sound via the speakers 10, 11.

The speakers 10, 11 are arranged symmetrically in the passenger compartment of the vehicle. For example, the speaker 10 is arranged at the driver's seat door, while the speaker 11 is arranged at the front passenger door. In addition, the audio amplifier 9 is also connected to a tuner deck 12. For instance, the tuner deck 12 receives a musical tune sound from a storage medium for music, or a radio program from a radio station and outputs them to the audio amplifier 9. The audio amplifier 9 amplifies the received musical tune sound and the radio program and outputs the amplified sounds via the speakers 10, 11.

The storage section 5 stores various data as follows: phonebook data indicating correspondence between telephone numbers and registration names; historical outgoing call data indicating correspondence between outgoing call clock times and destination phone numbers with respect to outgoing calls from the in-vehicle handsfree apparatus 1 or cellular phone 21 with which the HFP is connected; historical incoming call data indicating correspondence between incoming call clock times and source phone numbers with respect to incoming calls to the in-vehicle handsfree apparatus 1 or cellular phone 21 with which the HFP is connected; and historical missed incoming call data indicating correspondence between incoming call clock times and source phone numbers with respect to missed incoming calls to the in-vehicle handsfree apparatus 1 or cellular phone 21 with which the HFP is connected. Moreover, the storage section 5 can store a PBAP compliance flag indicating whether the cellular phone 21, which the in-vehicle handsfree apparatus 1 connects the HFP with, is compliant with the PBAP.

The display apparatus 13 includes a display section 14 for displaying display windows, and a touch operation section 15 forming a touch switch on the display window. The display management section 6 controls a display operation of the display section 14 in the display apparatus 13 based on a display command signal, which is received from the control section 2. The input section 7 receives an operation detection signal via the touch operation section 15 according to the user having operated the touch switch currently formed on the display window. The input section 7 outputs the received operation detection signal to the control section 2. The control section 2 processes the received operation detection signal by analyzing it.

The cellular phone 21 with the BT communication function is compliant with the HFP for performing a handsfree communication and the SDP for answering functions, which the cellular phone 21 can provide among functions specified in the BT communication standard, when queried from the in-vehicle handsfree apparatus 1. Moreover, the cellular phone 21 includes a type compliant with both the PBAP and OPP and a type compliant with the OPP but not compliant with the PBAP. When the cellular phone 21 is the type compliant to both the PBAP and OPP, the following takes place in the cellular phone 21. The SDP is connected with the in-vehicle handsfree apparatus 1. A PBAP compliant notice indicating that the cellular phone is compliant with both the PBAP and OPP is notified to the in-vehicle handsfree apparatus 1. In contrast, when the cellular phone 21 is the type compliant with the OPP and not compliant with the PBAP, the following takes place in the cellular phone 21. The SDP is connected with the in-vehicle handsfree apparatus 1. A PBAP non-compliant notice indicating that the cellular phone is not compliant with the PBAP but compliant with the OPP is notified to the in-vehicle handsfree apparatus 1.

An operation under the above configuration is explained with reference to FIGS. 2 to 7. Herein, it is assumed that the in-vehicle handsfree apparatus 1 can connect, with the cellular phone 21, (i) the HFP and (ii) either the PBAP or OPP, at the same time (i.e., multi-profile connection is possible).

Figure 2:
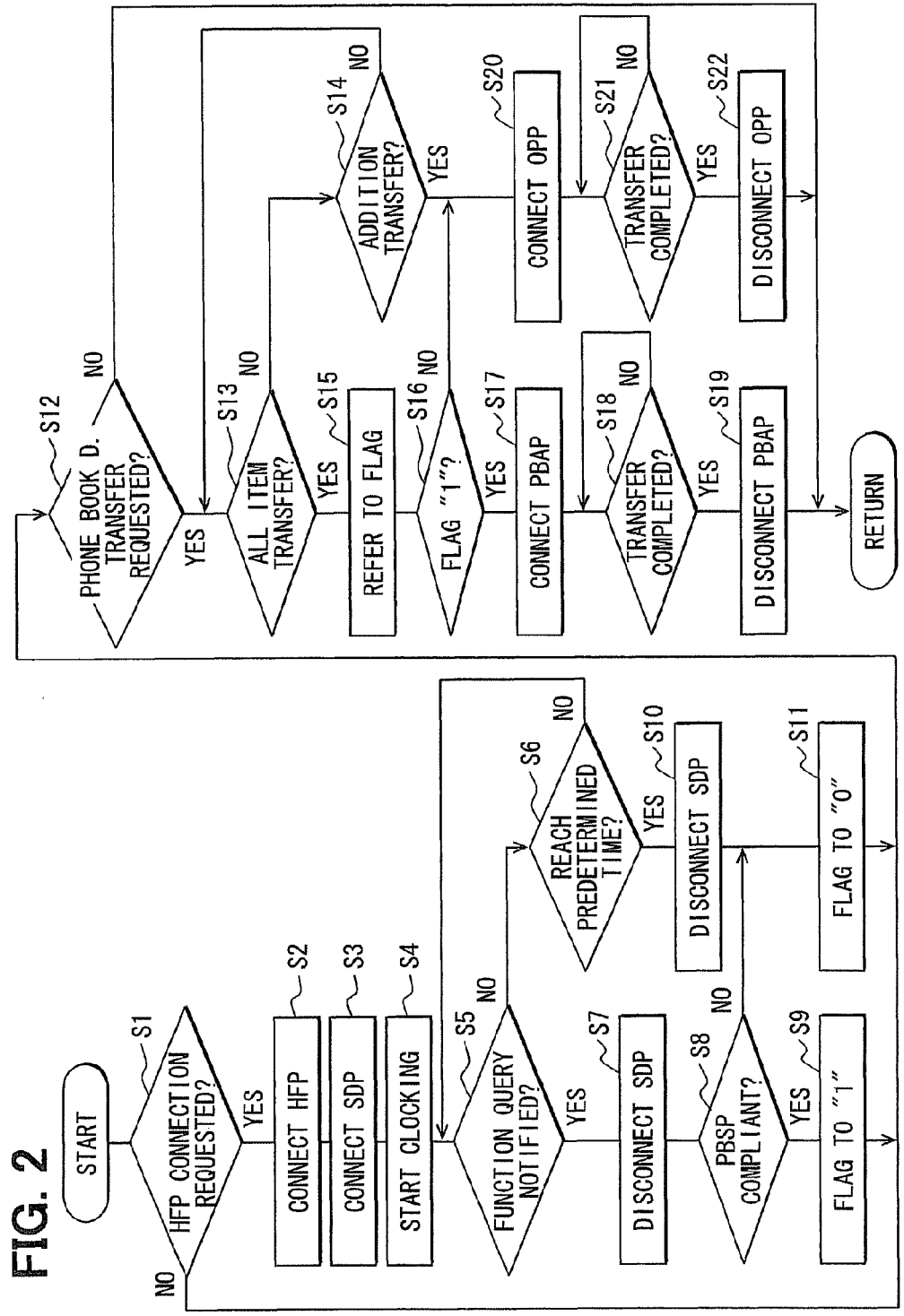
FIG. 2 is a flowchart according to the embodiment.
Figure 3:
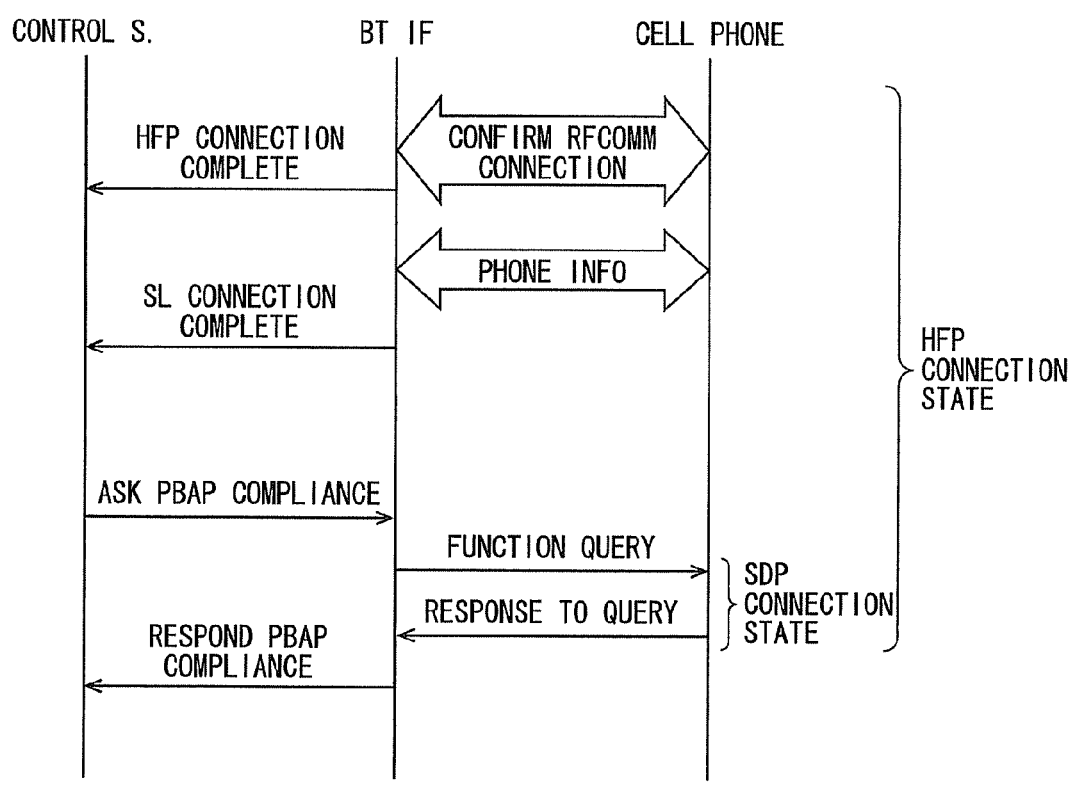
FIG. 3 is a sequence diagram according to the embodiment.

As illustrated in FIGS. 2, 3, in the in-vehicle handsfree apparatus 1, the control section 2 determines at S1 whether the cellular phone 21 exists in the BT communication range of the in-vehicle handsfree apparatus 1 and a connection request of the HFP with the cellular phone 21 occurs. When the determination at S1 is affirmed, the HFP is connected with the cellular phone 21 by the BT interface section 3 at S2.

Subsequently, the control section 2 receives a service layer connection (SLC) completion notice from BT interface section 3 and then outputs a request for confirming a PBAP compliance to BT interface section 3. The control section 2 causes the BT interface section 3 to connect the SDP with the cellular phone 21 and transmit a function query request to the cellular phone 21 at S3. The control section 2 starts clocking with a timer at S4. The control section 2 determines whether a response to the function query is notified from the cellular phone 21 at S5. The control section 2 determines whether an elapse time by clocking reaches a predetermined time at S6. Thus, the control section 2 waits for a notice of the function query response from the cellular phone 21.

Herein, the cellular phone 21 connects the SDP with the in-vehicle handsfree apparatus 1 and receives the function query request transmitted from the in-vehicle handsfree apparatus 1. The cellular phone 21 transmits to the in-vehicle handsfree apparatus 1, the function query response indicating functions the cellular phone can provide. That is, when the cellular phone 21 is a type compliant with both the PBAP and OPP, the PBAP compliance notice is transmitted to the in-vehicle handsfree apparatus 1. In contrast, when the cellular phone 21 is a type not compliant with the PBAP but compliant with OPP, the PBAP non-compliance notice is transmitted to the in-vehicle handsfree apparatus 1.

When the control section 2 determines that the function query response is notified from the cellular phone 21 before the elapse time reaches the predetermined time ("YES" at S5), the control section 2 disconnects the SDP, which has been connected with the cellular phone 21, at S7. The control section 2 determines at S8 whether the function query response notified from the cellular phone 21 is a PBAP compliance notice.

When determining ("YES" at S8) that the function query response notified from the cellular phone 21 is a PBAP compliance notice, the control section 2 assigns the PBAP compliance flag with "1" at S9 and determines at S12 whether a transfer request of the phone book data occurs. Thus, the control section 2 waits for occurrence of the transfer request of the phone book data. In contrast, when determining ("NO" at S8) that the function query response notified from the cellular phone 21 is not a PBAP compliance notice, the control section 2 assigns the PBAP compliance flag with "0" at S11 and determines at S12 whether a transfer request of the phone book data occurs. Thus, the control section 2 waits for occurrence of the transfer request of the phone book data.

In contrast, when the control section 2 determines ("YES" at S6) that the elapse time reaches the predetermined time before the function query response is notified from the cellular phone 21, the control section 2 disconnects the SDP, which has been connected with the cellular phone 21, at S10. The control section 2 similarly assigns the PBAP compliance flag with "0" at S11 and determines at S12 whether a transfer request of the phone book data occurs. Thus, the control section 2 waits for occurrence of the transfer request of the phone book data.

Figure 4A:
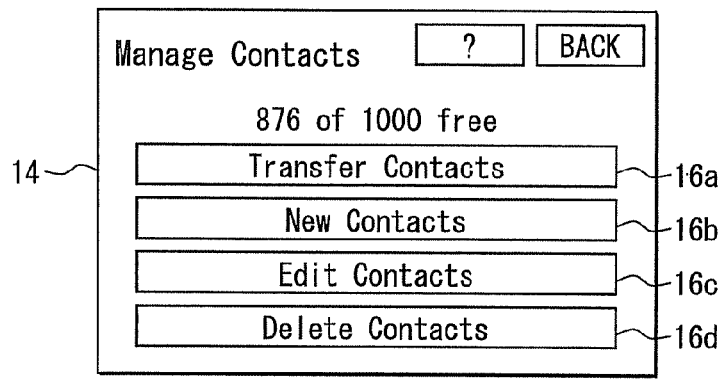
FIGS. 4A to 4D illustrate examples of display windows according to the embodiment.

Next, when a user performs an operation to display a phone book menu selection window, the control section 2 displays a phone book menu selection window in the display section 14 as illustrated in FIG. 4A. The phone book menu selection window includes Transfer Contacts 16a which is a transfer switch for transmitting the phone book data, New Contacts 16b which is a new production switch for producing new phone book data, Edit Contacts 16c which is an edit switch for editing phone book data, and Delete Contacts 16d which is a delete switch for deleting phone book data.

Figure 4B:
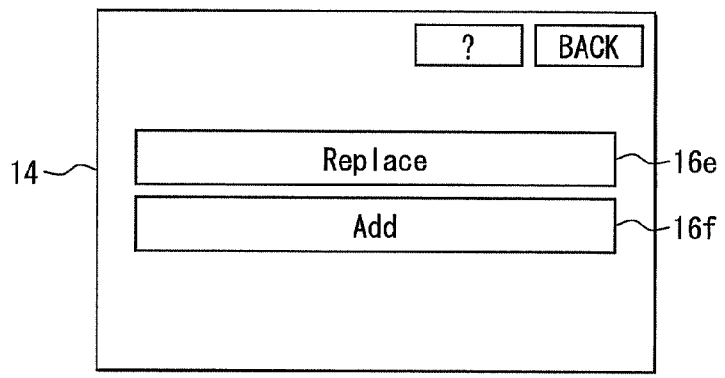

Herein, when determining that the user performs an operation to the transfer switch 16a, the control section 2 determines ("YES" at S12) that the transfer request of the phone book data occurs. The control section 2 displays a data transfer menu selection window in the display section 14 as illustrated in FIG. 4B. The data transfer menu selection window includes Replace 16e and Add 16f. Replace 16e is a transfer switch indicating an all item transfer to transmit as a transfer target all items of the phone book data registered in the cellular phone 21. Add 16f is a transfer switch indicating an addition transfer to transmit as a transfer target a part of the phone book data registered in the cellular phone 21.

When determining that the user performs an operation to the transfer switch 16e, the control section 2 determines ("YES" at S13) that the transfer request of the all item transfer occurs. The control section 2 refers to the PBAP compliance flag presently designated, at S15. It is determined at S16 whether the PBAP compliance flag is "1," or not, i.e., whether the cellular phone 21 is a type which notified of a PBAP compliance notice within the predetermined time.

When it is determined ("YES" at S16) that the PBAP compliance flag is "1," i.e., that the cellular phone 21 is a type which notified of a PBAP compliance notice within the predetermined time, the control section 2 generates a connection request of the PBAP to thereby connect the PBAP with the cellular phone 21, with which the handsfree apparatus establishes the connection of the HFP, at S17. The control section 2 starts a data transfer of the phone book data from the cellular phone 21 to the in-vehicle handsfree apparatus 1. At this time, the user does not need to perform an operation to the cellular phone 21.

Figure 4C:
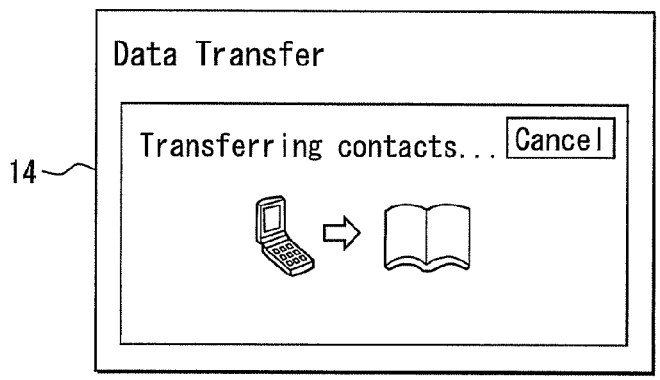

Next, the control section 2 displays in the display section 14 a PBAP transfer window illustrated in FIG. 4C to thereby notify the user that the data transfer of the phone book data from the cellular phone 21 to the in-vehicle handsfree apparatus 1 is performed by the connection of the PBAP. When the control section 2 determines ("YES" at S18) that the data transfer of the phone book data from the cellular phone 21 to the in-vehicle handsfree apparatus 1 is completed, the PBAP which has been connected with the cellular phone 21 is disconnected at S19. The processing is then returned.

In contrast, when it is determined ("NO" at S16) that the PBAP compliance flag is "0," i.e., that the cellular phone 21 is a type other than a type which notifies a PBAP compliant notice within the predetermined time, the OPP is connected with the cellular phone 21 at S20 in response to occurrence of the connection request of the OPP from the cellular phone 21 with which the HFP connection is established. The control section 2 starts a data transfer of the phone book data from the cellular phone 21 to the in-vehicle handsfree apparatus 1. At this time, the user needs to perform an operation to the cellular phone 21 to designate phone book data, which is to be transmitted to the in-vehicle handsfree apparatus 1 from the cellular phone 21.

Figure 4D:
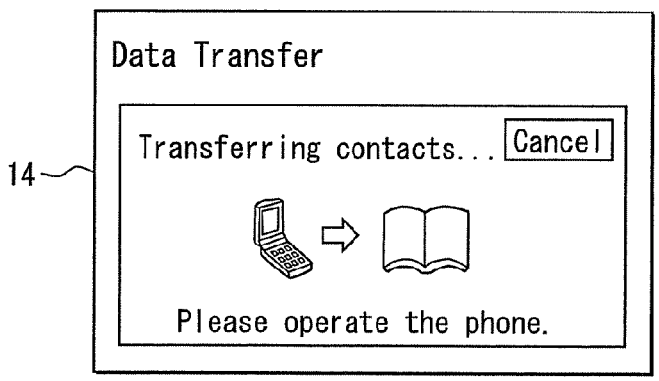

Next, the control section 2 displays in the display section 14 an OPP transfer window illustrated in FIG. 4D to thereby notify the user that the data transfer of the phone book data from the cellular phone 21 to the in-vehicle handsfree apparatus 1 is performed by the connection of the OPP. When the control section 2 determines ("YES" at S21) that the data transfer of the phone book data from the cellular phone 21 to the in-vehicle handsfree apparatus 1 is completed, the OPP connected with the cellular phone 21 is disconnected at S22, and the processing is returned.

When determining that the user performs an operation to the addition transfer switch 16f, the control section 2 determines ("YES" at S14) that the addition transfer request of the phone book data occurs. Herein, the control section 2 does not refer to the PBAP compliance flag presently designated. In response to occurrence of the connection request of the OPP from the cellular phone 21 with which the HFP connection is established, the OPP is connected with the cellular phone 21 at S20. The control section 2 thereby starts a data transfer of the phone book data from the cellular phone 21 to the in-vehicle handsfree apparatus 1. When the control section 2 determines ("YES" at S21) that the data transfer of the phone book data from the cellular phone 21 to the in-vehicle handsfree apparatus 1 is completed, the OPP connected with the cellular phone 21 is disconnected at S22, and the processing is returned.

As explained above, in the in-vehicle handsfree apparatus 1, the SDP is connected after the HFP is connected, and it is determined whether the cellular phone 21 with which the HFP connection is established is compliant with the PBAP. When the PBAP compliance notice is notified within the predetermined time from the cellular phone 21, the PBAP compliance flag is assigned with "1." In contrast, in cases other than the above case, i.e., in case that a notice of the function query response is not notified within the predetermined time from the cellular phone 21 or in case that the notice notified within the predetermined time is not the PBAP compliant notice, the PBAP compliance flag is assigned with "0." Then, when the user performs an operation to instruct the cellular phone 21 to transfer the phone book data, the PBAP compliance flag is referred to and either the PBAP or OPP is selected and connected with the cellular phone 21 accordingly. Herein, the PBAP flag "1" is only assigned with respect to the cellular phone or type of a cellular phone which notified the PBAP compliance notice within the predetermined time. Thus, a connection target for the PBAP is a cellular phone or type having a high possibility that the PBAP can be connected.

First Modification

Figure 5:
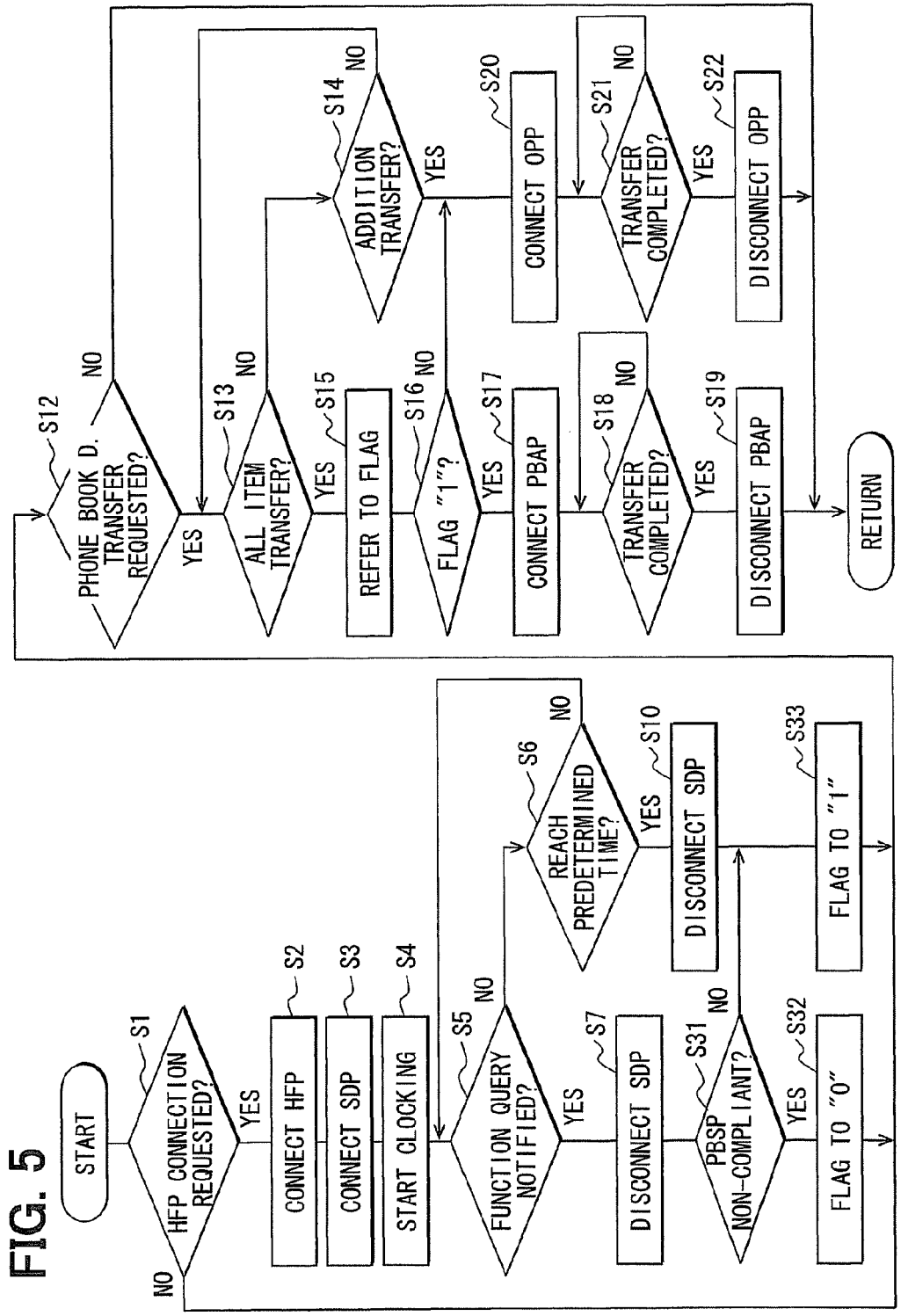
FIG. 5 is a flowchart according to a first modification.

In the above explanation, the control section 2 determines whether the response to the function query notified from the cellular phone 21 is a PBAP compliance notice. The control section 2 can determine whether the response to the function query notified from the cellular phone 21 is a PBAP non-compliance notice. In this case, as illustrated in FIG. 5, after disconnecting the SDP, which has been connected with the cellular phone 21, at S7, the control section 2 determines at S31 whether the response to the function query notified from the cellular phone 21 is a PBAP non-compliance notice.

When determining ("YES" at S31) that the response to the function query notified from the cellular phone 21 is a PBAP non-compliance notice, the control section 2 assigns the PBAP compliance flag with "0" at S32. In contrast, when determining ("NO" at S31) that the response to the function query notified from the cellular phone 21 is not a PBAP non-compliance notice, the control section 2 assigns the PBAP compliance flag with "1" at S33. In contrast, when the control section 2 determines ("YES" at S6) that the elapse time reaches the predetermined time before a response to the function query is notified from the cellular phone 21, the control section 2 disconnects the SDP, which has been connected with the cellular phone 21, at S10. The control section 2 similarly assigns the PBAP compliance flag with "1" at S33.

As explained above, in the in-vehicle handsfree apparatus 1, the SDP is connected after the HFP is connected and it is determined whether the cellular phone 21 with which the HFP connection is established is compliant with the PBAP. When the PBAP non-compliant notice is notified within the predetermined time from the cellular phone 21, the PBAP compliance flag is assigned with "0." In contrast, in cases other than the above case, i.e., in case that a response to the function query (or a notice of the function query response) is not notified within the predetermined time from the cellular phone 21 or in case that when a notice other than the PBAP non-compliance notice is notified within the predetermined time, the PBAP compliance flag is assigned with "1." Then, when the user performs an operation to instruct the cellular phone 21 to transfer the phone book data, the PBAP compliance flag is referred to and either the PBAP or OPP is selected and connected with the cellular phone 21, accordingly. Herein, the PBAP flag "1" is only assigned with respect to the cellular phone or type other than the cellular phone or type which notified the PBAP non-compliant notice within the predetermined time. Thus, the connection target of the PBAP includes, for example, a cellular phone or type which is specified to be unable to notify the PBAP compliant notice within the predetermined time, or which is specified not to notify the PBAP compliance notice within the predetermined time, although it is compliant with the PBAP.

Second Modification

Figure 6:
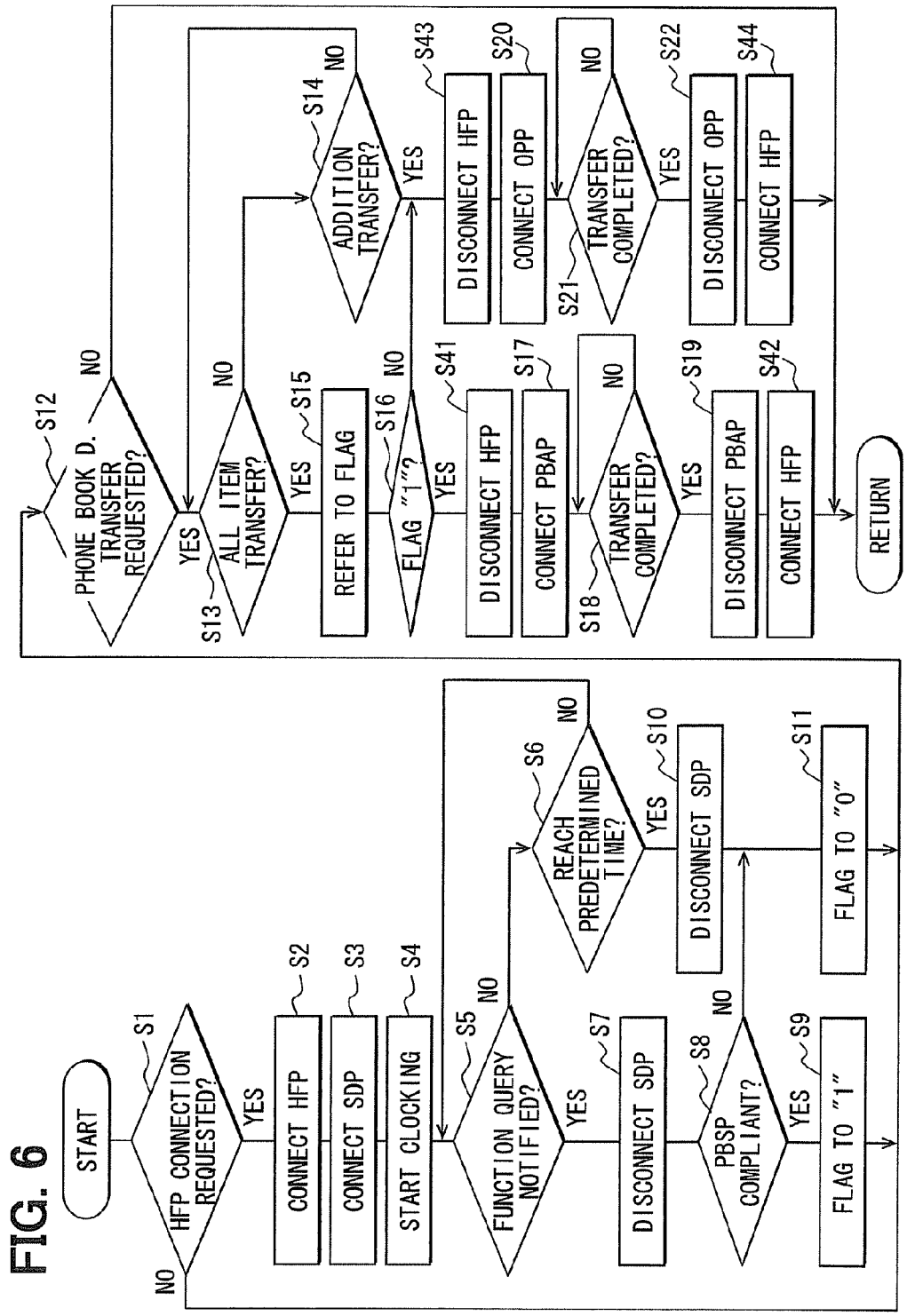
FIGS. 6, 7 are flowcharts according to a second modification.
Figure 7:
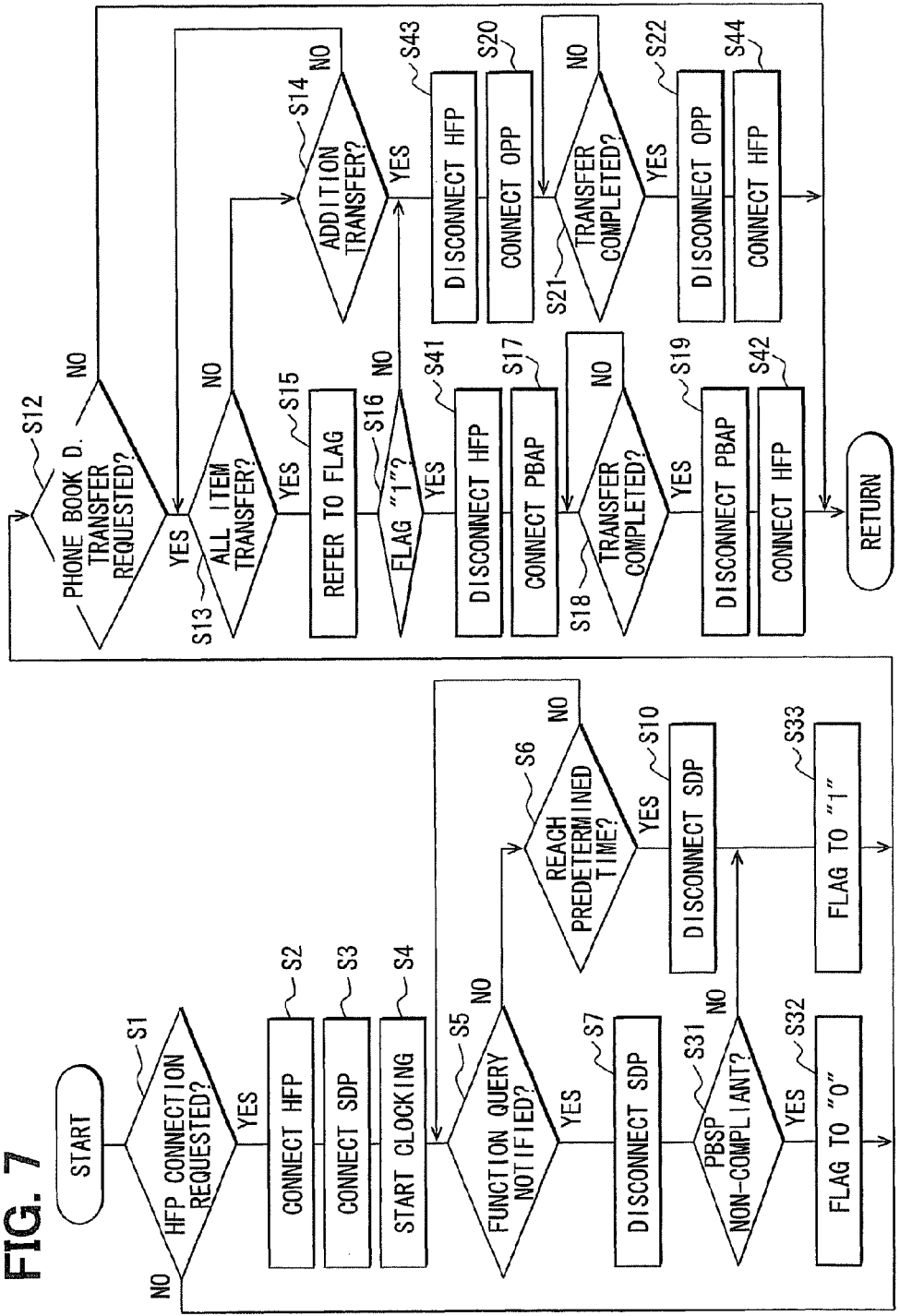

In the above, it is assumed that the in-vehicle handsfree apparatus 1 can connect both (i) the HFP and (ii) either the PBAP or OPP, at the same time, with the cellular phone 21 (i.e., multi-profile connection is possible). When it is impossible to carry out concurrent connection of (i) HFP and (ii) the PBAP or OPP between the cellular phone 21 and the in-vehicle handsfree apparatus 1, the control section 2 determines that the PBAP compliance flag is assigned with "1" ("YES" at S16) and the HFP, which has been connected with the cellular phone 21, is once disconnected at S41 as illustrated in FIGS. 6 and 7. The PBAP is then connected with the cellular phones 21 with which the HFP is once disconnected, at S17. When the control section 2 determines that the data transfer of the phone book data from the cellular phone 21 to the in-vehicle handsfree apparatus 1 is completed ("YES" at S16), the PBAP which has been connected with the cellular phone 21 is disconnected at S17 and then the HFP is re-connected with the cellular phone 21, with which the PBAP is disconnected, at S42. Thus, the connection state relative to the cellular phone is returned to the state having taken place before the PBAP is connected.

Moreover, when determining that the PBAP compliance flag is assigned with "0" ("NO" at S16), or when determining that the addition transfer request occurs ("YES" at S14), the HFP, which has been connected with the cellular phone 21, is once disconnected at S43. The OPP is connected at S20 with the cellular phone 21, with which the HFP is once disconnected. When the control section 2 determines that the data transfer of the phone book data from the cellular phone 21 to the in-vehicle handsfree apparatus 1 is completed ("YES" at S21), the OPP, which has been connected with the cellular phone 21, is disconnected at S22 and then the HFP is re-connected at S44 with the cellular phone 21, with which the OPP is disconnected. Thus, the connection state between the handsfree apparatus and cellular phone is returned to the state having taken place before the OPP is connected.

Third Modification

Figure 8:
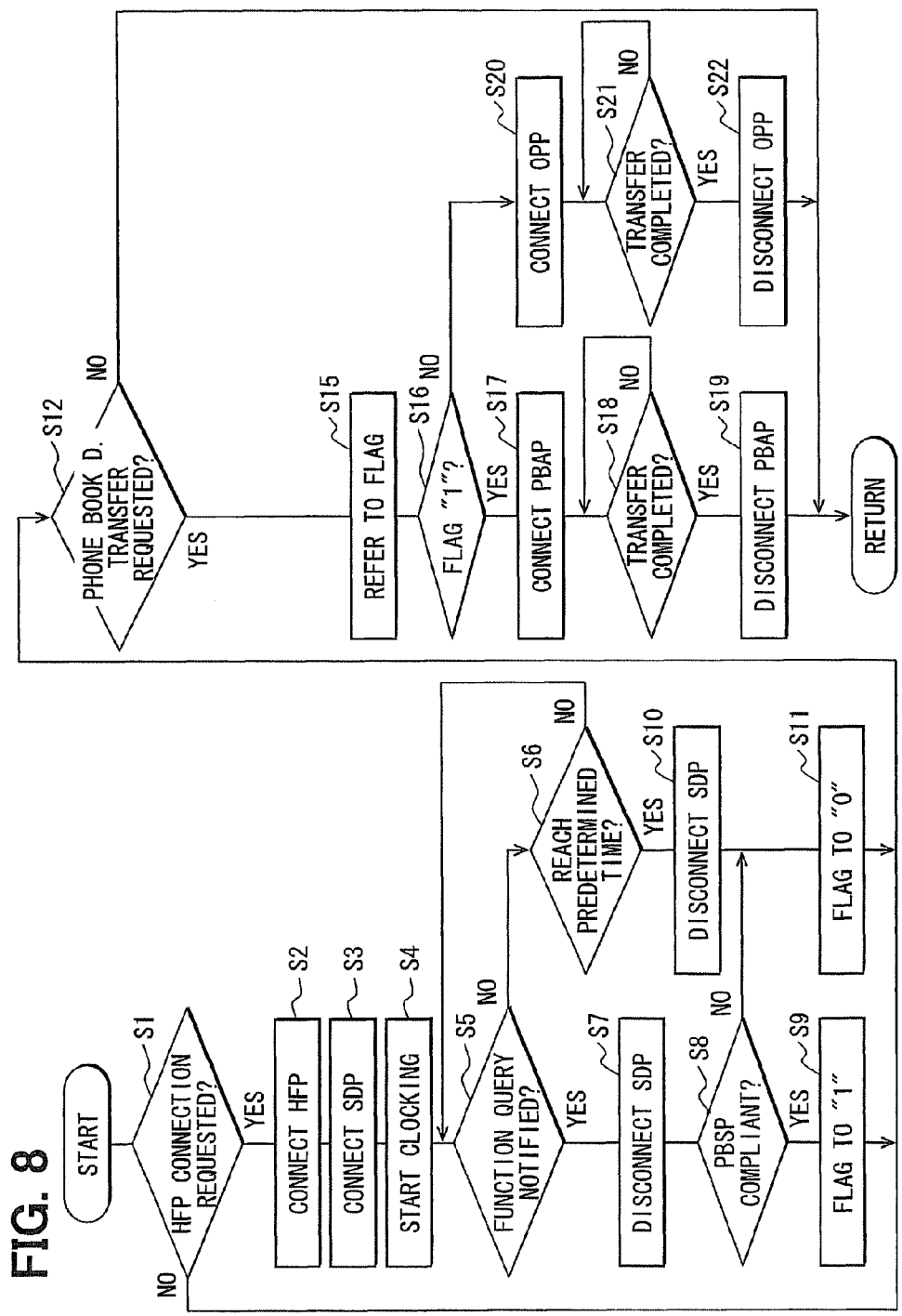
FIG. 8 is a flowchart according to a third modification.

Moreover, as illustrated in FIG. 8, S13, S14 may be eliminated in FIG. 2. That is, after the control section 2 assigns the PBAP compliance flag with "1" at S9 or "0" at S11, the control section 2 determines at S12 whether a transfer request of the phone book data occurs. Subsequently, when determining that the user performs an operation to the transfer switch 16a in FIG. 4A, the control section 2 determines ("YES" at S12) that the transfer request of the phone book data occurs. Then, in the present modification, while passing through S13 or S15, the processing directly proceeds to S15, where the control section 2 refers to the PBAP compliance flag presently designated. The following processing is identical to the explanation in the FIG. 2. This elimination of S13 and S14 can be applied to the flowchart of FIGS. 5, 6, 7, similarly.

Fourth Modification

In addition, it is assumed that multiple cellular phones 21 are present which are permitted to connect the HFP with the in-vehicle handsfree apparatus 1. In such a case, the storage section 5 may be configured to store, with respect to each cellular phone 21, the telephone information and PBAP compliance flag in association with each other. Thus, the handsfree apparatus 1 connects the SDP with the relevant cellular phone 21 once at first to thereby cause the storage section 5 to store the telephone information and PBAP compliance flag of the relevant cellular phone 21 in association with each other. Thus, it is not necessary to connect the SDP at the next time while only the telephone information needs to be determined.

Others

As explained above, in the in-vehicle handsfree apparatus 1 according to the embodiment, the following takes place. After the HFP is connected with the cellular phone 21, the SDP is connected with the cellular phone 21 with which the HFP connection is established. Thereby, the compliance state of the PBAP in the cellular phone is designated as a PBAP compliance flag. Then, when a user operates an instruction of transmission of all the phone book data registered in the cellular phone, the handsfree apparatus 1 refers to the PBAP compliance flag to thereby select and connect either the PBAP or OPP with the cellular phone. Therefore, the in-vehicle handsfree apparatus 1 allows data transfer of the phone book data from the cellular phone 21 without need of previously knowing which profile the cellular phone 21 is compliant with for data transfer by performing an operation to instruct the cellular phone 21 to transmit the phone book data to the in-vehicle handsfree apparatus 1. Usability can be thereby raised.

Moreover, when transmitting all the phone book data, it is not necessary to operate the cellular phone 21 at all. In contrast, when transmitting a part of the phone book data, it is necessary to operate the cellular phone 21. Thus, when transfer of all the phone book data is directed, it is determined whether the cellular phone 21 is compliant with the PBAP. When the cellular phone is a type compliant with the PBAP, the PBAP is selected. In contrast, when addition transfer, i.e., transfer of part of the phone book data is directed, the OPP is selected without determining whether the cellular phone 21 is compliant with the PBAP. Therefore, the transfer of the phone book data can be performed from the cellular phone 21 to the in-vehicle handsfree apparatus 1 by appropriately selecting a profile suitable for the use.

Further, in case that the PBAP compliance notice is notified within the predetermined time from the cellular phone 21, the PBAP compliance flag is assigned with "1." In contrast, in cases other than the above case, the PBAP compliance flag is assigned with "0." Such a configuration improves the certainty that the PBAP can be connected. In case that the PBAP non-compliant notice is notified within the predetermined time from the cellular phone 21, the PBAP compliance flag is assigned with "0." In contrast, in cases other than the above case, the PBAP compliance flag is assigned with "1." Such a configuration allows the connection target of the PBAP to include a cellular phone or type which is specified to be unable to notify the PBAP compliance notice within the predetermined time although complying with the PBAP, or which is specified not to notify the PBAP compliance notice within the predetermined time although complying with the PBAP. Thus the above configuration helps prevent the type compliant with the PBAP from being improperly precluded.

Furthermore, when the PBAP compliance flag is assigned with "1," the PBAP may be connected with the cellular phones 21 without need of user's operation to instruct the cellular phone 21 to transmit the phone book data. In such a configuration, immediately after asking the cellular phone 21 about the compliance state for the PBAP, the phone book data can be automatically transmitted to the in-vehicle handsfree apparatus 1 from the cellular phone 21. The newest phone book data registered in the cellular phone 21 can be automatically registered in the in-vehicle handsfree apparatus 1.

The present invention is not limited only to the above-mentioned embodiment or explanation, and can be modified or extended, for example, as follows. The in-vehicle handsfree apparatus may be replaced by an in-vehicle navigation apparatus having a handsfree function. While executing connection procedure or handshaking of the HFP, the SDP may be connected. Alternatively, after the connection procedure for the HFP is completed, the SDP can be connected.

Each or any combination of processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

Aspects of the disclosure described herein are set out in the following clauses.

As a first aspect of the disclosure, an in-vehicle handsfree apparatus is provided as follows. A first phone book data transfer protocol connecting section is configured to connect a first phone book data transfer protocol with a cellular phone compliant with the first phone book data transfer protocol for executing a phone book data transfer from the cellular phone to the in-vehicle handsfree apparatus without need of a user's operation to the cellular phone. A second phone book data transfer protocol connecting section is configured to connect a second phone book data transfer protocol with a cellular phone compliant with the second phone book data transfer protocol for executing a phone book data transfer from the cellular phone to the in-vehicle handsfree apparatus with need of a user's operation to the cellular phone. A handsfree protocol connecting section is configured to connect a handsfree communication protocol with a cellular phone compliant with the handsfree communication protocol for executing a handsfree communication using the cellular phone. A function query protocol connecting section is configured to connect a function query protocol with a cellular phone compliant with the function query protocol for asking a compliance state relative to a phone book data transfer protocol of the cellular phone. A control section is configured, when connecting the handsfree communication protocol with a cellular phone using the handsfree protocol connecting section, to connect the function query protocol with the cellular phone using the function query protocol connecting section and store in a storage section a function query response, which is notified by the cellular phone, in association with the cellular phone. Further, the control section is configured, when the user performs, using an operation section, an operation to require all item transfer, which regards all items of phone book data as a transfer target, to refer to a function query response associated with a cellular phone, which the all item transfer is required of, in the storage section and select one of the first phone book data transfer protocol and the second phone book data transfer protocol, to thereby connect the one of the first phone book data transfer protocol and the second phone book data transfer protocol using a corresponding one of the first phone book data transfer protocol connecting section and the second phone book data transfer protocol connecting section.

Under the above configuration, when the user performs an operation to require the all item transfer of the phone book data, the compliance state relative to the phone book data transfer protocol of the cellular phone is already stored as a function query response. Based on the stored function query response, either the first phone book data transfer protocol or the second phone book data transfer protocol can be selected. Thus, after performing an operation to require the all item transfer of the phone book data, the user is not required to know which function the relevant cellular phone has. In other words, the phone book data can be transmitted to the in-vehicle handsfree apparatus from the cellular phone only by the user performing the operation to require the all item transfer of the phone book data. Usability can be thereby enhanced.

In addition, it is unnecessary to operate the cellular phone at all when transmitting all the items of the of the phone book data registered in the cellular phone. Thus, if the relevant cellular phone is a type compliant with the first phone book data transfer protocol, which does not require any operation of the user to the cellular phone, the first phone book data transfer protocol is selected. Therefore, the transfer of the phone book data can be performed from the cellular phone to the in-vehicle handsfree apparatus by appropriately selecting a profile suitable for the use.

As an optional aspect, in the in-vehicle handsfree apparatus, the control section may be further configured, when the user performs, using the operation section, an operation to require an addition transfer, which regards a part of phone book data as a transfer target, without referring to a function query response associated with a cellular phone, which the addition transfer is required of, in the storage section, to select the second phone book data transfer protocol to thereby connect the selected second phone book data transfer protocol using the second phone book data transfer protocol connecting section.

Under the above configuration, when the user performs an operation to require the addition transfer of the phone book data, the user's operation in the cellular phone is necessary and the second phone book data transfer to transmit the phone book data from the relevant cellular phone to the in-vehicle handsfree apparatus is selected. It is necessary to operate the cellular phone when transmitting a part of the phone book data registered in the cellular phone. Thus, regardless of whether the relevant cellular phone is a type compliant with the first phone book data transfer protocol, the second phone book data transfer protocol is selected. Therefore, the transfer of the phone book data can be performed from the cellular phone to the in-vehicle handsfree apparatus by appropriately selecting a profile suitable for the use.

As a second aspect of the disclosure, an in-vehicle handsfree apparatus is provided as follows. A first phone book data transfer protocol connecting section configured to connect a first phone book data transfer protocol with a cellular phone compliant with the first phone book data transfer protocol for executing a phone book data transfer from the cellular phone to the in-vehicle handsfree apparatus without need of a user's operation to the cellular phone. A second phone book data transfer protocol connecting section is configured to connect a second phone book data transfer protocol with a cellular phone compliant with the second phone book data transfer protocol for executing a phone book data transfer from the cellular phone to the in-vehicle handsfree apparatus with need of a user's operation to the cellular phone. A handsfree protocol connecting section is configured to connect a handsfree communication protocol with a cellular phone compliant with the handsfree communication protocol for executing a handsfree communication using the cellular phone. A function query protocol connecting section is configured to connect a function query protocol with a cellular phone compliant with the function query protocol for asking a compliance state relative to a phone book data transfer protocol of the cellular phone. A control section is configured, when connecting the handsfree communication protocol with a cellular phone using the handsfree protocol connecting section, to connect a function query protocol with the cellular phone using the function query protocol connecting section and store a function query response, which is notified by the cellular phone, in association with the cellular phone in a storage section. Further, the control section is configured, when the user performs an operation to require a phone book data transfer using the operation section, to refer to a function query response, which is stored in the storage section in association with a cellular phone, which the phone book data transfer is required of, and select one of the first phone book data transfer protocol and the second phone book data transfer protocol to thereby connect the one of the first phone book data transfer protocol and the second phone book data transfer protocol using a corresponding one of the first phone book data transfer protocol connecting section and the second phone book data transfer protocol connecting section.

Under the above configuration, when the user performs an operation to require a phone book data transfer, the compliance state relative to the phone book data transfer protocol of the cellular phone is already stored as a function query response. Based on the stored function query response, either the first phone book data transfer protocol or the second phone book data transfer protocol can be selected. The phone book data can be transferred to the in-vehicle handsfree apparatus from the cellular phone without need of requiring the user to know which function the relevant cellular phone has. Usability can be thereby enhanced.

As an optional aspect, in the in-vehicle handsfree apparatus, the control section may be further configured: when being notified that the cellular phone is compliant with the first phone book data transfer protocol before a predetermined time elapses since the function query protocol is connected with the cellular phone by the function query protocol connecting section, to store, in the storage section, information indicating that the cellular phone is compliant with the first phone book data transfer protocol; and when being not notified that the cellular phone is compliant with the first phone book data transfer protocol before the predetermined time elapses since the function query protocol is connected with the cellular phone by the function query protocol connecting section, or when the predetermined time elapses without being notified that the cellular phone is compliant with the first phone book data transfer protocol, to store, in the storage section, information indicating that the cellular phone is not compliant with the first phone book data transfer protocol.

Under the above configuration, only a type of a cellular phone, which notifies of compliance with the first phone book data transfer protocol within the predetermined time, can be a connection target for the first phone book data transfer protocol. The certainty which connects the first phone book data transfer protocol can be increased.

As an optional aspect, in the in-vehicle handsfree apparatus, the control section being further configured: when being notified that the cellular phone is not compliant with the first phone book data transfer protocol before a predetermined time elapses since the function query protocol is connected with the cellular phone by the function query protocol connecting section, to store, in the storage section, information indicating that the cellular phone is not compliant with the first phone book data transfer protocol; and when not being notified that the cellular phone is not compliant with the first phone book data transfer protocol before the predetermined time elapses since the function query protocol is connected with the cellular phone by the function query protocol connecting section, or when the predetermined time elapses without being notified that the cellular phone is not compliant with the first phone book data transfer protocol, to store, in the storage section, information indicating that the cellular phone is compliant with the first phone book data transfer protocol.

Under the above configuration, a cellular phone other than a type of a cellular phone, which notifies of non-compliance with the first phone book data transfer protocol within the predetermined time, can be a connection target for the first phone book data transfer protocol. For instance, a connection target can include a type of a cellular phone having a specification, which is compliant with the first phone book data transfer protocol and does not notify of compliance with the first phone book data transfer protocol within the predetermined time, or a type of a cellular phone having a specification, which is compliant with the first phone book data transfer protocol and unable to notify of compliance with the first phone book data transfer protocol within the predetermined time. Thus, the more types of cellular phones compliant with the first phone book data transfer protocol can be included as connection targets.

As an optional aspect, in the in-vehicle handsfree apparatus, the control section may be further configured, when the storage section stores information indicating that the cellular phone is compliant with the first phone book data transfer protocol, to connect the first phone book data transfer protocol with the cellular phone using the first phone book data transfer protocol connecting section even if the user does not perform an operation to require a phone book data transfer using the operation section.

Under the above configuration, when the cellular phone is compliant with the first phone book data transfer protocol, the phone book data can be transferred to the in-vehicle handsfree apparatus from the cellular phone immediately after the compliance state relative to the phone book data transfer protocol of the cellular phone is queried, without need of user's operation to require a phone book data transfer using the operation section. The newest phone book data registered in the cellular phone can be registered in the in-vehicle handsfree apparatus.

It will be obvious to those skilled in the art that various changes may be made in the above-described embodiments of the present invention. However, the scope of the present invention should be determined by the following claims.

What is claimed is:

1. An in-vehicle handsfree apparatus comprising:
a first phone book data transfer protocol connecting section configured to connect a first phone book data transfer protocol with a cellular phone compliant with the first phone book data transfer protocol for executing a phone book data transfer from the cellular phone to the in-vehicle handsfree apparatus without need of a user's operation to the cellular phone;
a second phone book data transfer protocol connecting section configured to connect a second phone book data transfer protocol with a cellular phone compliant with the second phone book data transfer protocol for executing a phone book data transfer from the cellular phone to the in-vehicle handsfree apparatus with need of a user's operation to the cellular phone;
a handsfree protocol connecting section configured to connect a handsfree communication protocol with a cellular phone compliant with the handsfree communication protocol for executing a handsfree communication using the cellular phone;
a function query protocol connecting section configured to connect a function query protocol with a cellular phone compliant with the function query protocol for asking a compliance state relative to a phone book data transfer protocol of the cellular phone; and
a control section configured,
when connecting the handsfree communication protocol with a cellular phone using the handsfree protocol connecting section,
to connect a function query protocol with the cellular phone using the function query protocol connecting section and store a function query response, which is notified by the cellular phone, in a storage section,
the control section being further configured,
when the user performs an operation to require a phone book data transfer using the operation section,
to refer to the function query response of the cellular phone stored in the storage section, and select one of the first phone book data transfer protocol and the second phone book data transfer protocol to thereby execute the phone book data transfer from the cellular phone to the in-vehicle handsfree apparatus using the one of the first phone book data transfer protocol and the second phone book data transfer protocol.

2. The in-vehicle handsfree apparatus according to claim 1, the control section being further configured,
when the user performs, using the operation section, an operation to require an addition transfer, which regards as a transfer target a part of phone book data registered in the cellular phone,
to execute the addition transfer of the part of phone book data from the cellular phone to the in-vehicle handsfree apparatus by using the second phone book data transfer protocol.

3. The in-vehicle handsfree apparatus according to claim 1, the control section being further configured:
when being notified that the cellular phone is compliant with the first phone book data transfer protocol before a predetermined time elapses since the function query protocol is connected with the cellular phone by the function query protocol connecting section,
to store, in the storage section, information indicating that the cellular phone is compliant with the first phone book data transfer protocol; and
when not being notified that the cellular phone is compliant with the first phone book data transfer protocol before the predetermined time elapses since the function query protocol is connected with the cellular phone by the function query protocol connecting section, or when the predetermined time elapses without being notified that the cellular phone is compliant with the first phone book data transfer protocol,
to store, in the storage section, information indicating that the cellular phone is not compliant with the first phone book data transfer protocol.

4. The in-vehicle handsfree apparatus according to claim 1, the control section being further configured:
when being notified that the cellular phone is not compliant with the first phone book data transfer protocol before a predetermined time elapses since the function query protocol is connected with the cellular phone by the function query protocol connecting section,
to store, in the storage section, information indicating that the cellular phone is not compliant with the first phone book data transfer protocol; and
when not being notified that the cellular phone is not compliant with the first phone book data transfer protocol before a predetermined time elapses since the function query protocol is connected with the cellular phone by the function query protocol connecting section, or when the predetermined time elapses without being notified that the cellular phone is not compliant with the first phone book data transfer protocol,
to store, in the storage section, information indicating that the cellular phone is compliant with the first phone book data transfer protocol.

5. The in-vehicle handsfree apparatus according to claim 1, the control section being further configured,
when the storage section stores information indicating that the cellular phone is compliant with the first phone book data transfer protocol,
to connect the first phone book data transfer protocol with the cellular phone using the first phone book data transfer protocol connecting section even if the user does not perform an operation to require a phone book data transfer using the operation section.

6. The in-vehicle handsfree apparatus according to claim 1, the control section being further configured,
while the handsfree communication protocol is being connected with the cellular phone using the handsfree protocol connecting section,
to connect the function query protocol with the cellular phone using the function query protocol connecting section and store the function query response, which is notified by the cellular phone, in the storage section.

7. The in-vehicle handsfree apparatus according to claim 1, the control section being further configured,
after connecting the handsfree communication with the cellular phone using the handsfree protocol connecting section,
to connect the function query protocol with the cellular phone using the function query protocol connecting section and store the function query response, which is notified by the cellular phone, in the storage section.

8. An in-vehicle handsfree apparatus comprising:
a first phone book data transfer protocol connecting section configured to connect a first phone book data transfer protocol with a cellular phone compliant with the first phone book data transfer protocol for executing a phone book data transfer from the cellular phone to the in-vehicle handsfree apparatus without need of a user's operation to the cellular phone;
a second phone book data transfer protocol connecting section configured to connect a second phone book data transfer protocol with a cellular phone compliant with the second phone book data transfer protocol for executing a phone book data transfer from the cellular phone to the in-vehicle handsfree apparatus with need of a user's operation to the cellular phone;
a handsfree protocol connecting section configured to connect a handsfree communication protocol with a cellular phone compliant with the handsfree communication protocol for executing a handsfree communication using the cellular phone;
a function query protocol connecting section configured to connect a function query protocol with a cellular phone compliant with the function query protocol for asking a compliance state relative to a phone book data transfer protocol of the cellular phone; and
a control section configured,
when connecting the handsfree communication protocol with a cellular phone using the handsfree protocol connecting section,
to connect a function query protocol with the cellular phone using the function query protocol connecting section and store a function query response, which is notified by the cellular phone, in a storage section,
the control section being further configured,
when the user performs an operation to require a phone book data transfer using the operation section,
to refer to the function query response of the cellular phone stored in the storage section, and execute the phone book transfer from the cellular phone to the in-vehicle handsfree apparatus using the first phone book data transfer protocol out of the first phone book data transfer protocol and the second phone book data transfer protocol.

* * * * *